United States Patent
Stock et al.

(10) Patent No.: US 6,249,630 B1
(45) Date of Patent: *Jun. 19, 2001

(54) APPARATUS AND METHOD FOR DELIVERY OF DISPERSION-COMPENSATED ULTRASHORT OPTICAL PULSES WITH HIGH PEAK POWER

(75) Inventors: Michelle L. Stock; Martin E. Fermann; Almantas Galvanauskas; Donald J. Harter; Gregg D. Sucha, all of Ann Arbor, MI (US)

(73) Assignee: Imra America, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/232,807

(22) Filed: Jan. 19, 1999

Related U.S. Application Data (63) Continuation-in-part of application No. 08/763,381, filed on Dec. 13, 1996, now Pat. No. 5,862,287, and a continuation-in-part of application No. 08/789,995, filed on Jan. 28, 1997, now Pat. No. 5,880,877.

(51) Int. Cl.[7] .............................. G02B 6/02; H04B 10/00
(52) U.S. Cl. ............................................ 385/123; 359/161
(58) Field of Search ............................. 385/123; 359/173, 359/332, 161, 333; 372/25

(56) References Cited

U.S. PATENT DOCUMENTS 5,862,287 * 1/1999 Stock et al. .......................... 385/123

* cited by examiner

Primary Examiner—Cassandra Spyrou
Assistant Examiner—Jared Treas
(74) Attorney, Agent, or Firm—Sughrue, Mion, Zinn, Macpeak & Seas, PLLC (57) ABSTRACT

An apparatus and method for delivery of high peak power pulse through an optical fiber to an optical device includes an ultrashort pulsed laser source which produces ultrashort optical pulses having high peak power. Prior to transmitting the optical pulses through a delivery optical fiber, the pulse width of the optical pulses is stretched, forming chirped optical pulses having a lower peak power. The stretched pulses are transmitted through an optical fiber which delivers the pulse to an optical device requiring ultrashort, high peak power optical pulses. The optical fiber and/or an output unit coupled to the end of the optical fiber introduces a dispersion which compensates for the dispersion introduced by the pulsed laser source and the stretcher, and delivers a recompressed optical pulse to an optical device. The optical fiber delivery system preferably pre-compensates for the dispersion introduced by optical components within the optical device, so that the optical pulses are fully recompressed at a point of interest within the optical device, such as at a specimen or at a detector. The optical fiber delivery system may include a frequency converter either before or after the delivery optical fiber. The frequency converter allows optical pulses having frequencies other than that generated by the laser source to be delivered to the optical device in an efficient manner.

62 Claims, 5 Drawing Sheets

APPARATUS AND METHOD FOR DELIVERY OF DISPERSION-COMPENSATED ULTRASHORT OPTICAL PULSES WITH HIGH PEAK POWER

This is a Continuation-in-Part of application Ser. No. 08/763,381 filed Dec. 13, 1996 now U.S. Pat. No. 5,862,287 and application Ser. No. 08/789,995 filed Jan. 28, 1997 now U.S. Pat. No. 5,880,877.

BACKGROUND OF THE INVENTION

1. Field of the Invention

The present invention generally relates to an optical pulse delivery system for various types of optical devices, such as an optical measurement system, requiring ultrashort pulses with high peak power. More particularly, the present invention relates to an optical pulse delivery system which employs an optical fiber and which is capable of compensating for various dispersion effects within the system (including those within the optical device, if desired) in order to deliver high peak power pulses.

2. Description of the Related Art

Ultrashort optical pulse sources are presently known to be capable of creating pulses having pulse widths of picosecond to sub-picosecond duration at a variety of wavelengths, pulse energies, and repetition rates up to the GHz regime. Such optical pulse sources are commonly used in measurement and imaging applications that require time gating or excitation by a high peak power or high intensity. Ultrashort optical pulses provide both high spatial and high temporal resolutions, as well as high peak powers in a focusable beam necessary for the excitation of certain non-linear events (such as the excitation of a multi-photon fluorescent medium). These capabilities find use in applications including biological and medical imaging, metrology, terahertz generation, photoconductive and electro-optical sampling, and optical time domain reflectometers.

Current techniques for the delivery of ultrashort optical pulses to a device under test or a measurement point include the use of optical components such as mirrors, lenses, optical fiber, beamsplitters, and dichroic elements. Ultrashort optical pulses passing through a delivery system made of such elements will experience a change in peak power as well as distortions in their temporal profile. These distortions may result in a reduction in resolution, or a degradation in signal-to-noise ratio. The changes in peak power and temporal shape of an ultrashort optical pulse signal propagating through an optical system are caused by losses and dispersion. In addition, at high peak powers, non-linear effects can distort the optical pulse.

An ultrashort optical pulse is made up of a certain range of optical frequencies (or wavelengths), which constitutes its bandwidth. The shortest pulse for a given bandwidth (the bandwidth-limited pulse) has all of its frequency components perfectly overlapped in time. In propagation through a system, the different wavelength components of a pulse experience different delays. These different delays will cause the above-mentioned distortion in temporal shape and change in peak power of ultrashort optical pulses. The result is a frequency chirped pulse, where instantaneous frequency is a function of time along the pulse.

Propagation through a common optically transparent material used to deliver optical signals, is such as glass, will generally result in very small loss. However, due to the frequency dependent refractive index $n(v)$ of the medium, which gives the velocity, $v$, of propagation of the optical signal by the relationship $v=c/n(v)$, where $c$ is the speed of light in a vacuum, different wavelengths, $\lambda$, experience different velocities in the material, where wavelength is related to frequency by $\lambda=/cv$. This effect is referred to as chromatic dispersion. Through the interaction of a pulsed optical signal and such a material, pulse broadening can occur due to group velocity dispersion (GVD). This effect causes the lower frequency components and the higher frequency components of the bandwidth to arrive at different times after passing through the dispersing medium. The effect may be that the lower frequency components arrive earlier or later, depending upon the sign of the dispersion. In glass, for wavelengths shorter than the zero-dispersion wavelength (~1300 nm), the sign of the dispersion is positive, and higher frequencies of the optical pulse travel more slowly than lower frequencies. Above the zero-dispersion wavelength, the sign of the dispersion is negative, and lower frequencies of the optical pulse travel more slowly than higher frequencies. Therefore, any optical element through which the ultrashort optical pulse is transmitted may potentially have a distorting effect.

Dispersion manipulation may be performed with several well known optical elements and systems. These include glass prisms, diffraction gratings, fiber gratings, and optical fiber. These elements allow for both signs of dispersion to be reached at any wavelength, as well as allowing for compensation of frequency chirp. Glass prism pairs can be used to create a dispersive delay line, where, by varying the distance between the two prisms, different amounts of dispersion can be achieved. Similarly, using either reflective or transmissive diffraction gratings, variable amounts of both positive and negative dispersion can be provided. Fiber gratings are chirped Bragg gratings written in the core of an optical fiber. In a chirped fiber grating, dispersion is achieved by reflecting different wavelengths at different locations in space, thereby adding different time shifts to different wavelength components. Specialty fibers can be made for wavelengths longer than ~1300 nm. These fibers use waveguide dispersion in conjunction with material dispersion to create tailored dispersion which may be positive, negative, or close to zero.

Of the commonly used optics for beam steering in an optical system, optical fibers are a convenient method of delivery in practical systems, particularly those where the laser source is bulky. Optical fibers offer increased reliability and robustness, by allowing for stable pre-alignment of components. By providing confinement of the laser light, optical fiber delivery allows for placement of the laser source in more diverse environments than the typical laser laboratory, as well as allowing for convenient placement of the source of light with respect to the rest of the system, providing more flexibility in system design. Additionally, the optical fiber can be disconnected without disturbing the alignment of the laser source and the optical device; thus, the two systems can be pre-aligned and shipped separately in different boxes. However, optical fibers can distort the temporal profile of ultrashort optical pulses, as described below.

Optical fibers can be characterized as being single-mode (capable of propagating a single spatial mode) or multi-mode (capable of supporting the propagation of many spatial modes) for wavelength $\lambda$. Considering the single-mode case, the properties of optical fiber pulse propagation include: a frequency dependent loss, material dispersion giving rise to pulse broadening, and waveguide dispersion. At the "zero dispersion" point where the material dispersion changes sign (for instance, in standard telecommunications fiber, at ~1300 nm) pulses may propagate without significant broadening. However, as the material dispersion effect decreases, waveguide dispersion becomes significant, arising from the confinement of the mode at the core-cladding interface. In multi-mode fiber, the situation is further complicated by the addition of many spatial modes which may produce further temporal broadening. However, multi-mode fiber is of interest in a number of applications due to its higher tolerance to misalignment.

In long-haul fiber-optic telecommunications systems, there exists the problem of high bit-error-rates due to broadening of optical signal pulses along the long optical fiber delivery lengths. This problem has been addressed using various schemes, including dispersion compensation by using specially designed optical fibers, pre-chirping of the pulses, possibly using optical fiber gratings for either of these techniques. However, the peak powers of the signals used in these systems are below the onset of non-linear effects; these systems do not address the delivery of high peak power (high peak power is herein defined as >1 kW) pulses through the optical fiber.

One system that requires the delivery of optimized pulse widths is that of a two-photon laser microscope. As disclosed by Denk, et al. in U.S. Pat. No. 5,034,613, such a system comprises a laser scanning microscope, a fluorophore having the appropriate emission with long wavelength (red or infrared) illumination as a stain for a sample, a picosecond or sub-picosecond laser source of appropriate wavelength, a detector for the emission of the fluorophore, and signal processing provided by a computer. Although several different sources have been used to provide ultrashort pulses including Ti:Sapphire and Cr:LiSAF, the delivery of the high peak power pulses has been made in "free space". In one such system reported by M. Muller et al. in "Measurement of Femtosecond Pulses in the Focal Point of a High-Numerical-Aperture Lens by Two-Photon Absorption", *Optics Letters*, Vol. 20, No. 9 (1995), the microscope objective was found to distort the pulses incident upon the lens, broadening the pulses appreciably.

Another example of an application that requires optimized pulses is optical metrology. In optical metrology, measurement of a physical parameter is made in a non-destructive, non-contact manner using an optical measuring device. The device includes a source of optical pulses, a delivery mechanism, and a probe that is inserted in such a way that the light source illuminates an object to be measured and its reflection is captured for signal processing. A convenient manner of delivering the light from the pulsed source is to provide the light through optical fiber which is incorporated into the probe. The probe may then be constructed to be convenient for mounting into a measurement system, bringing the probe into approximate contact with the sample. In this system, the resolution is dependent upon achieving the high peak power (shortest) pulse at the measurement point, which is in the doubling crystal of an auto-correlator or cross-correlator within the measurement system. However, optical fiber delivery alone creates a condition that is not optimized to deliver the shortest pulses to that point.

Other systems have utilized some form of optical fiber delivery of modelocked pulses to a sample under investigation. In particular, in International Application No. PCT/US92/03536, Huang et al. describe a system for optical coherence domain reflectometry, which includes optical fiber delivery of a short coherence length source to the sample under measurement. Such a source may be either a broad-bandwidth, superluminescent source or an ultrashort pulse (and thus broad-bandwidth) modelocked source. In the measurement technique, there exists a reference and a sample path which are arranged as an interferometer (the two paths must create optical interference in order to obtain the measurement information). A necessary condition for this interference to occur is that the optical path lengths from the source to the reference and from the source to the sample must be nearly equal, a condition described by: $L_{ref} - L_{sample} \sim L_{coherence}$, where $L_{ref}$ is the optical path length from the source to the reference, $L_{sample}$, is the optical path length from the source to the sample, and $L_{coherence}$ is the coherence length of the optical source. This condition must be true for all wavelengths. Here, it is recognized that, if the length of optical fiber in one leg of the system is shorter than the other, for say light on the blue side of the spectrum, another optical material of known higher GVD and shorter length may be added to the shorter arm to equalize these optical path lengths, thus compensating the relative length as a function of wavelength. This compensation is performed to ensure that each component wavelength in the broad bandwidth light arrives at the end points of the two optical paths at the same time (i.e. the shortest wavelengths, the middle wavelengths, and the longest wavelengths arrive at the same time). For use with a modelocked source, the pulse widths need not be short. However, the chirp is the same for pulses from each path.

In a similar system reported by Bouma et al. in "High-Resolution Optical Coherence Tomographic Imaging Using a Mode-Locked Ti:Al$_2$O$_3$ Laser Source", *Optics Letters*, Vol. 20, No. 13 (1995), optical coherence tomographic imaging is performed using a modelocked Cr:Forsterite laser. Again, the optical bandwidth of the laser is of primary importance to the imaging technique.

Therefore, the limited bandwidth of the Cr:Forsterite was enhanced by using the well-known method of generating bandwidth in optical fiber using self-phase modulation. Thus, an optical fiber was added between the output of the laser and the input of the imaging system, providing the side benefit of ease of alignment. Here, however, there was no need, nor intent, to provide optimized pulse widths to the sample under investigation. In fact, to achieve the shortest pulses it is normally desired to avoid self-phase modulation.

Another system that takes advantage of optical fiber delivery is described by Harris in U.S. Pat. No. 5,120,953. Here, light is delivered to a sample in a scanning confocal microscope via an optical fiber, and the back-scattered signal generated at the sample is collected in the same optical fiber for detection. The optical fiber is used to eliminate rigid positional requirements on the confocal imaging optics in the path of the microscope and to act as a spatial filter for the input light mode and the back-scattered signal light. There is no concern for the pulse width of the light in such a system, due to the fact that single-photon fluorescence is the source of the signal, which fluorescence is proportional to the average power rather than intensity of the light incident upon the sample. That is why CW lasers rather than pulsed sources are used for this application.

In an optical measurement system such as the scanning confocal microscope, optical fiber delivery is particularly advantageous. A particular measurement system might incorporate an ultrafast light source coupled to an optical system via a delivery fiber. In the case of two-photon microscopy, it is essential to deliver to the sample light pulses having high peak power with low total energy. The laser intensity (i.e. W/cm$^2$) must be high enough for two photon absorption to proceed at an acceptable rate. However, above a certain energy level, pulses can cause photobleaching and possibly damage the sample.

Accordingly, there is a need to provide a measurement system with an ultrasbort pulse light source which delivers a short duration high peak power but low total energy pulse.

SUMMARY OF THE INVENTION

It is an object of the present invention to deliver high peak power pulses through an optical fiber into an optical device, such as a measurement system, wherein the pulse shape characteristics of the high peak power pulses are optimized at a desired point of interaction.

Another object of the present invention is to control the dispersion effects within an optical pulse source and/or a delivery optical fiber in order to compensate for the dispersion effects in an optical device, such as an optical measurement system.

It is a further object of the present invention to avoid pulse distortion caused by the non-linear effects which result when high peak power pulses are propagated through an optical fiber delivery system.

To achieve the above objects, the present invention includes an ultrashort pulsed laser source which produces ultrashort optical pulses having high peak power. Prior to transmitting the optical pulses through a delivery optical fiber, the pulse width of the optical pulses is stretched, forming chirped optical pulses having a lower peak power. The pulse stretching may be performed within the laser or by a separate stretcher unit. A chirp of the optical pulses coming directly from the laser source can be used with or without other dispersion devices (i.e. holographic gratings, optical fiber gratings, metallic gratings, optical fiber, specialty optical fiber, or prisms).

The stretched optical pulses are transmitted through an optical fiber which delivers the pulse to an optical device requiring ultrashort, high peak power optical pulses. Because the peak power of the optical pulses is reduced by the stretching of the pulse width, the non-linear effects experienced by high peak power pulses in optical fibers is avoided. The optical fiber and/or a pulse compressor introduce a dispersion which compensates for the dispersion introduced by the pulsed laser source and the stretcher, and delivers a recompressed optical pulse to an optical device. The optical fiber delivery system preferably pre-compensates for the dispersion introduced by optical components within the optical device, so that the optical pulses are fully recompressed at a point of interest within the optical device, such as at a specimen or at a detector.

The present invention can be used to deliver high peak power pulses (>1 kW) through an optical fiber to a test specimen in a measurement system, such as a stained biological tissue for two-photon confocal microscopy or to the surface of an object so that its position can be measured by an autocorrelation technique.

Additionally, the optical fiber delivery system of the present invention may include a frequency converter either before or after the delivery optical fiber. The frequency converter allows optical pulses having frequencies other than that generated by the laser source to be delivered to the optical device in an efficient manner.

A chirped periodically poled non-linear frequency converter, such as a periodically poled lithium-niobate crystal (PPLN), may be used as both a frequency converter and the stretcher (or compressor). The PPLN crystal is capable of producing a pulse whose frequency is double that of the incident pulse, and the frequency chirp of the crystal can be designed to match the sign and the magnitude of the dispersion of the compensating components, as required.

BRIEF DESCRIPTION OF THE DRAWINGS

The above and other objects and advantages of the present invention will become more apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
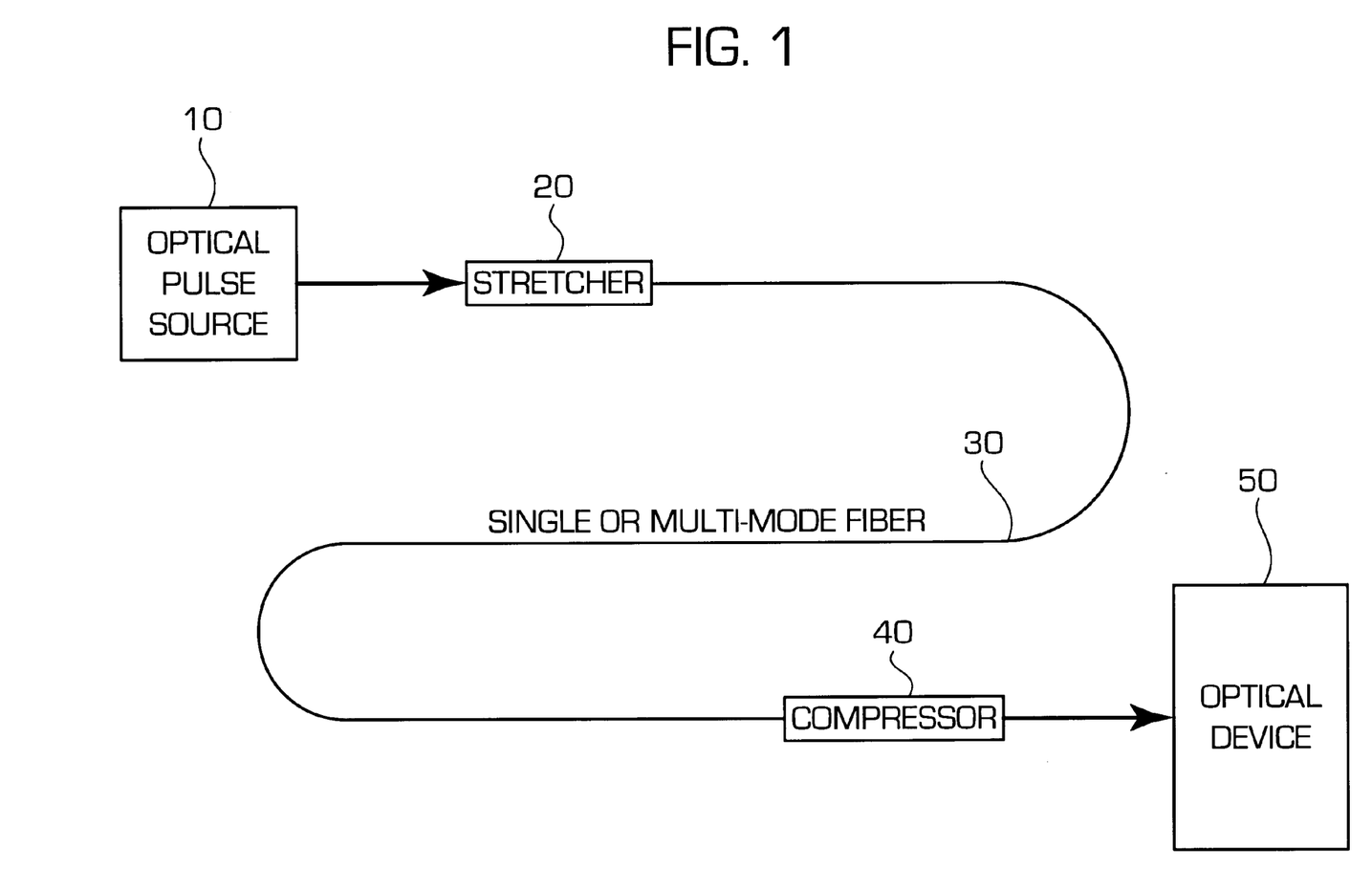
FIG. 1 is a diagrammatic view of an optical fiber delivery apparatus according to a general embodiment of the present invention.

FIG. 1 illustrates the configuration of an optical fiber delivery apparatus according to a general embodiment of the present invention. As shown in FIG. 1, an optical pulse source 10 generates optical pulses having high peak power. The optical pulse source 10 can be, for example, a passively modelocked fiber laser, and may include an oscillator and an amplifier. The ultrashort optical pulses produced by optical pulse source 10 have a pulse width which may be less than 100 ps and a peak power which may be more than 1 kW. An erbium-doped fiber laser is preferable because the wavelength (1.55 $\mu$m) of the light generated therefrom is suitable for use with both positive and negative dispersion optical fiber as well as low dispersion optical fiber.

The optical pulses are introduced from the optical pulse source 10 to a pulse stretcher 20. The pulse stretcher 20 may comprise any of the following: an optical fiber, chirped optical fiber Bragg gratings, a diffraction grating pair, or a prism pair. Alternatively, stretched pulses may be generated by the source 10 itself. The pulse stretcher 20 extends the pulse width of the incident optical pulses, forming a chirped optical pulses. Due to the extension of the pulse width, the peak power of the optical pulses is reduced. The stretched optical pulses are then transmitted through a fiber 30 which delivers the optical pulses to a desired location. Single-mode fiber is preferred for many applications, since multi-mode fiber can present the complexity of the different modes presenting differing propagation lengths. However, multi-mode fiber can be used to advantage in a number of situations. Multi-mode fiber has a larger effective mode-field diameter, and accordingly a higher peak power delivery capability. One particularly attractive case for using multi-mode fiber in delivery (using either passive or active (amplifier) fiber) is the case when the lowest order mode is excited in a multimode fiber. This takes advantage of the larger effective mode-field diameter, allowing for higher peak power delivery due to lower non-linear effect threshold, while avoiding the dispersion problem from the transmission of several modes through the fiber. Additional details regarding the use of multimode fiber and fiber amplifiers in this context, the reader is referred to U.S.

application Ser. No. 08/789,995 to Fermann et al, hereby incorporated by reference herein. Additionally, a mode converter may be employed as described in the copending Fermann application cited above. The multimode fiber may be either non-polarization maintaining or polarization maintaining, as needed in the particular system.

To construct a polarization-maintaining multi-mode fiber, several different fiber designs can be implements. For example polarization-maintaining multi-mode fibers can be produced by incorporating stress-producing regions in the fiber. Those stress-producing regions break the degeneracy of the two polarization directions inside the fiber and can reduce mode-coupling between the two polarization directions inside the fiber and can reduce mode-coupling between the two polarization directions sufficiently to produce polarization maintaining operation while preserving a circular fundamental mode.

Another convenient method to produce polarization maintaining fiber is to incorporate an elliptical fiber core. We tested multi-mode fibers with an ellipticity as small as 20%, i.e. a core diameter of 20×24 $\mu$m and an outside cladding diameter of 250 $\mu$m that allowed polarization maintaining operation over fiber lengths as long as 10 m for fiber bend radii as small as 10 cm. The use of small core ellipticities is advantageous as deviation of the fundamental mode in the multi-mode fiber from circularity also remains small, allowing for optimum focussing of the output of the fiber delivery system which is of critical importance for example for scanning two-photon microscopy. To reduce the susceptibility to mode-coupling and depolarization it can also be advantageous to minimize the bend diameter of the multi-mode delivery fiber by encasing it in some reinforced high-strength sleaving material.

For excitation of the fundamental mode in the multi-mode fiber a short section of single-mode mode-filter can be conveniently spliced to the input of the multi-mode fiber delivery system. Alternatively, the multi-mode fiber can be tapered down to a small enough diameter such that only the fundamental mode is supported at the input of the multi-mode fiber delivery system. For the details of this process the reader is referred to U.S. application Ser. No. 08/789,995 to Fermann et al.. Clearly, the use of a short section of single-mode fiber is allowed as the nonlinearity of this section is negligible.

However, generally we can expect that the excitation of the fundamental mode in the multi-mode delivery fiber is not perfect and a fraction f of the input light is injected to higher-order modes. If just 5% of the light is propagating in higher-order modes, the spectrum of the pulses measured at the output of the multi-mode fiber becomes highly modulated due to group-velocity walk-off between the modes. Assuming that the fraction f goes only into one higher-order mode, a satellite pulse with a peak intensity of f (for the present exampler f=5%) compared to the main pulse will exist at the output of the fiber delivery system. This may be an undesirable feature in some measurement apparatus.

To reduce the impact of imperfect fundamental mode-excitation, a second single-mode mode-filter fiber can be implemented at the output of the multi-mode fiber delivery system. Such a second mode-filter fiber can be as short as 1 cm and can have negligible nonlinearity. Such a short mode-filter actually does not attenuate the higher-order modes, but simply spreads them out over the fiber cross section leading to a very small, in practice undetectable background. Only the fraction of the higher-order modes that is coupled back into the fundamental modes will affect the pulse quality of the fundamental mode. Clearly, assuming the same splice imperfection, the level of the satellite pulses in the fundamental mode is now reduced to $f^2$, which for the present example is a satellite pulse with a peak intensity of only 5%×5%/=0.25% compared to the main pulse. Moreover, the output of the fiber delivery system is now perfectly diffraction limited, which is of great benefit in many optical measurement systems.

Even for a fundamental mode excitation efficiency of only 90% in the multi-mode fiber, the level of satellite pulses will be as small as 1%, which clearly demonstrates that the implementation of two mode-filters is very beneficial in ensuring a high pulse quality in multi-mode fiber delivery systems.

Typically, single-mode fibers are not suitable for transmitting optical pulses having high peak power, because high peak power leads to distortions caused by strong non-linear effects and causes a reduction in peak power.

The arrangement of the invention, however, can overcome this problem, because the high peak power of the optical pulses generated by optical pulse source 10 is reduced prior to introducing the pulses into the single-mode fiber 30. That is, the peak power of the optical pulses is reduced in the process of stretching the pulse with pulse stretcher 20. Consequently, the optical pulses are not severely distorted by non-linear effects and do not suffer a reduction in peak power as they propagate through single-mode fiber.

A compressor 40 operates to compress the pulse width of the optical pulses which have been transmitted through the fiber 30. In this general embodiment, the compressor may be one or more of an optical fiber, a diffraction grating pair, chirped optical fiber Bragg gratings, or a prism pair. One possibility is that optical fiber 30 itself provides the compressor, in whole or part. In this case, in order fully to recompress the optical pulses to their original bandwidth and peak power at a desired point of interaction, which may for example be at the input to optical device 50, or at a desired point within device 50. In the case of compensation through to a point within the optical device 50, the chirp (i.e., dispersion) within the length of single-mode fiber 30 and through the optical device 50 must be equal and opposite to that incident on fiber 30 (i.e., equal and opposite to the chirp introduced by the optical pulse source 10 and/or pulse stretcher 20). Accordingly, a length of the single-mode fiber 30 may be designed to compensate for the total dispersion of the system, from the optical pulse source 10 to or through the optical device 50, inclusive. The fiber 30 is of opposite dispersion to the pulse stretcher 20 and will preferably be of high dispersion in order to minimize the length for non-linear effects. Further discussion of dispersion compensation using dispersive fiber may be found in U.S. Pat. No. 5,696,782, which is hereby incorporated by reference.

The optical device 50 has known dispersion, thus, providing the final compression of the high peak power pulse at a desired point within the optical device 50, such as the measurement point or at the detector, is both easy and highly advantageous.

Although the optical pulse source 10 and the input unit 20 are shown in FIG. 1 as separate units, the optical pulse source 10 may produce chirped optical pulses, and may not require a separate pulse stretcher as noted above. That is, the chirped optical pulses produced by such a laser source may have peak power and pulse width characteristics that do not require the use of a separate stretcher to expand the pulse width and to reduce peak power.

The apparatus of this general embodiment solves two key problems. First, the dispersion of the delivery optical fiber is compensated so that the shortest pulse duration (and the highest peak-power) may be achieved at the desired point in the optical device 50, such as at a measurement point or at a detector. Second, high peak power optical pulses are delivered from an optical fiber delivery system without distortions caused by the non-linear effects ordinarily suffered by high peak power pulses in optical fibers.

Specifically, the onset of non-linear effects such as Raman generation and self-phase modulation will distort and broaden optical pulses. In optical fibers, the detrimental effect of these interactions can be neglected if the dispersion length, $L_d = T_o^2/|\beta_2|$ of a pulse in an optical fiber is shorter than the non-linear length $L_N = 1/gP_o : L_d/L_N > 1$, where $|\beta_2|$ is the magnitude of fiber dispersion coefficient, $\lambda$ is the optical fiber non-linearity coefficient, Po is peak power of the laser pulse and $T_o$ is the compressed-pulse duration. The dispersion length $L_d$ and the nonlinear length $L_N$ provide the length scales over which the dispersive or non-linear effects become important for pulse evolution along an optical fiber. In other words, if the dispersion length is shorter than the non-linear length, then pulses get stretched or compressed much faster than non-linear effects would cause temporal and spectral distortions.

Laser pulses with a peak power of >1 kW (or >about 9 kW in the case of multi-mode fiber) can not propagate within the optical fiber with little dispersion because $L_d/L_N > 1$. However, by propagating a chirped pulse (i.e., a pulse that has been stretched by the optical pulse source 10 or pulse stretcher 20, the peak power is reduced and thus the non-linear length increases without changing the dispersion length. Then, for example, an optical fiber with significant optical fiber dispersion (short dispersion length) can be used to recompress the pulse. Consequently, the optical pulse will be short only at the end of the optical fiber and will have high peak power there.

The present invention can provide dispersion compensation for positive or negative dispersion effects. This allows for flexible optimization which can be calibrated to the optical path of the system so that a system user may provide the proper pre-compensation for an adjustable system, e.g., the microscope objectives in a turret in a two-photon laser scanning microscope. Such methods bring increased flexibility, robustness, and reliability to system design, as well as improved signal-to-noise ratio and resolution in the overall system.

The compensation method according to the present invention can be elucidated by considering as an example an erbium-doped modelocked optical fiber laser. The emission wavelength of this type of laser is around 1550 nm, which experiences anomalous, or negative, dispersion when propagating in a standard single-mode optical fiber. The zero dispersion point (between the two regimes of dispersion) occurs around 1300 nm. However, waveguide dispersion can be strong in the region around the zero dispersion point. It is in fact possible to change the sign of the dispersion experienced by 1550 nm by appropriate waveguide design. Therefore, optical fiber of both signs of dispersion may be fabricated. In an erbium-doped modelocked optical fiber laser design, it is possible to use optical fiber of both signs of dispersion. The output pulse may therefore be tailored to have a certain residual dispersion, which may, in combination with an optical fiber in the delivery path, then be optimized to be equal and opposite to that encountered within the optical device 50.

To achieve very high peak power optical pulses, a chirped pulse amplification (CPA) optical fiber delivery system can be implemented using an amplifier between the pre-compensation (stretching) and compressing stages, and the system can be used for optical fiber delivery to a measurement device for certain applications. The CPA optical fiber delivery system uses a single pass amplifier and a polarization maintaining amplifier fiber for the delivery fiber if polarization at the output must be preserved, which is normally the case. Using CPA, the optical fiber delivery system of the present invention is capable of delivering optical pulses with peak power powers between $2 \times 10^4$ and $7 \times 10^7$ Watts.

Often, the frequency of the light generated by the optical pulse source 10 must be converted to a different frequency before impinging onto the sample. Accordingly, the optical fiber delivery system of the present invention can include a frequency conversion crystal.

Figure 2:
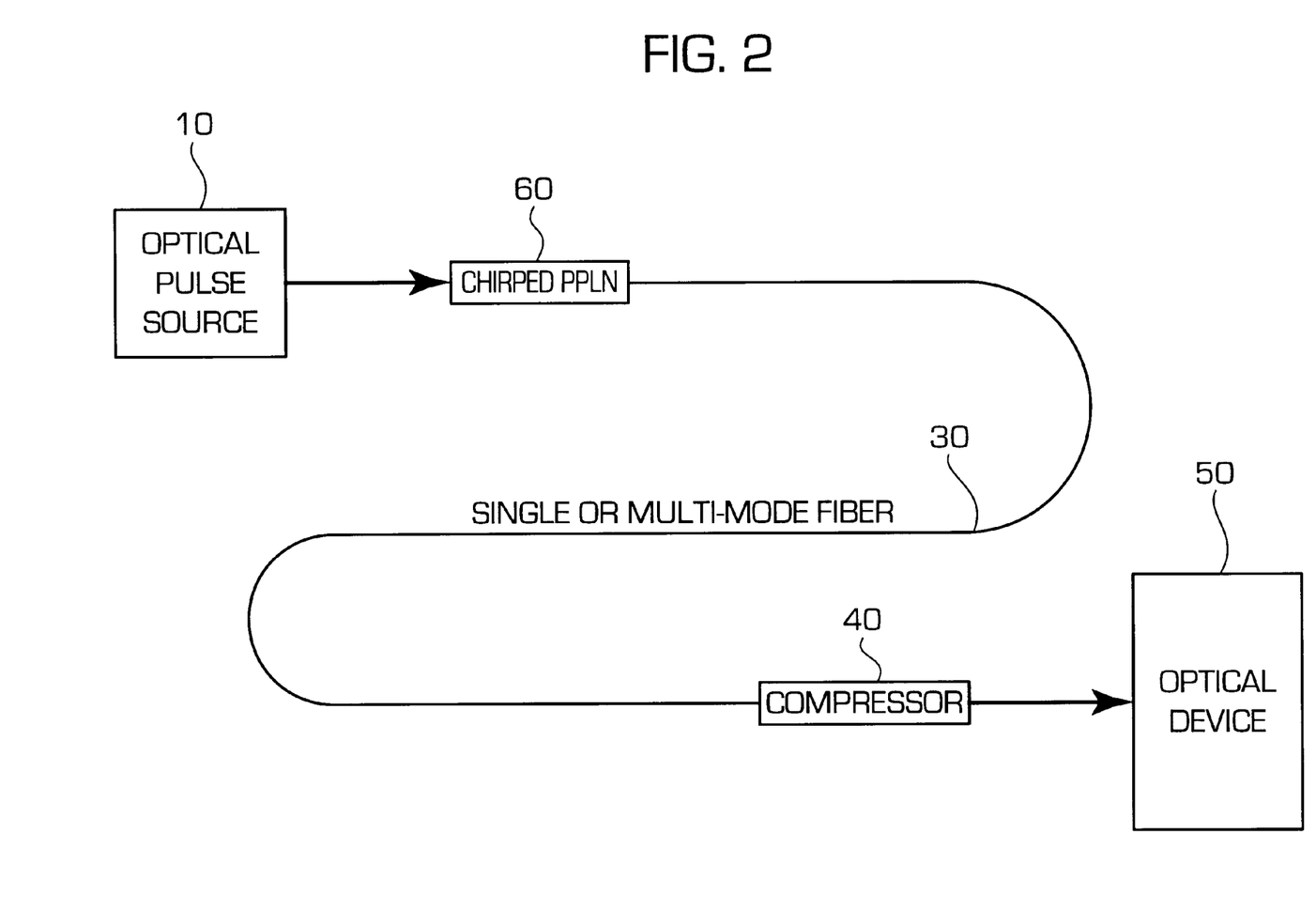
FIG. 2 is a diagrammatic view of an optical fiber delivery apparatus according to the first embodiment of the present invention.

FIG. 2 illustrates the configuration of an optical fiber delivery apparatus according to the first specific embodiment of the present invention. As shown in FIG. 2, optical pulses from optical pulse source 10 are introduced to a chirped PPLN 60 which performs both frequency conversion and pulse stretching.

Chirped PPLN 60 is a chirped periodically poled non-linear frequency converter. The utilization of chirped quasi-phasematched gratings for recompression of ultrashort pulses during doubling was first suggested in talks by Byer (CLEO Pacific Rim July '95), then Fejer (CLEO May '96) and finally in more detail by Arbore, Fejer, Harter, Marco, and Fermann (CNOM Annual meeting September '96). The ability to perform chirp compensation and frequency conversion in a chirped quasi-phasematched (QPM) crystal is based on two key features of such crystals. First, as typical in any non-linear bulk material, group velocities of the input fundamental pulse and of the output frequency-converted pulse are different along the same propagation path. This causes temporal walk-off between these two pulses. Second, a quasi-phasematched crystal can be designed so that frequency conversion (e.g. second-harmonic generation) for different input wavelengths can be localized at a different spatial position along the pulse propagation path. This can be achieved by using chirped rather than conventional unchirped QPM gratings. When launched into such a crystal, a bandwidth-limited pulse at the fundamental wavelength will produce frequency-converted (second-harmonic) pulses with a frequency chirp. This frequency chirp can be chosen by the design of the crystal to match the sign and the magnitude of the dispersion of the compensating components.

The duration of this second-harmonic (SH) pulse $\Delta T$ is determined by the magnitude of the group-velocity walk-off: $\Delta T = L/\upsilon_{SH} - L/\upsilon_{Fund}$. Here, L is the length of the crystal and $\upsilon_{SH}, \upsilon_{Fund}$ are the group-velocities at second-harmonic and fundamental wavelengths. The frequency-bandwidth $\Delta n$ of the SH pulse is given by the magnitude of the QPM period variation (chirp bandwidth). The dispersion required to compensate this frequency chirp is equal to $\Delta T/\Delta n$. Launching fundamental pulses from two opposite directions would result in second-harmonic pulses with opposite signs of frequency-chirp.

Chirped PPLN 60 is a crystal with a chirped inverted-domain grating, induced by electric-field poling. For 1550 nm pumping and 780 nm second-harmonic, the group-velocity walk-off is ~300 fs/mm. The bandwidth of a chirped PPLN can be several tens of nanometers. This is sufficient to generate prestretched second-harmonic pulses that can be compensated further in an optical system using approximately one to a few meters of optical fiber.

Figure 3:
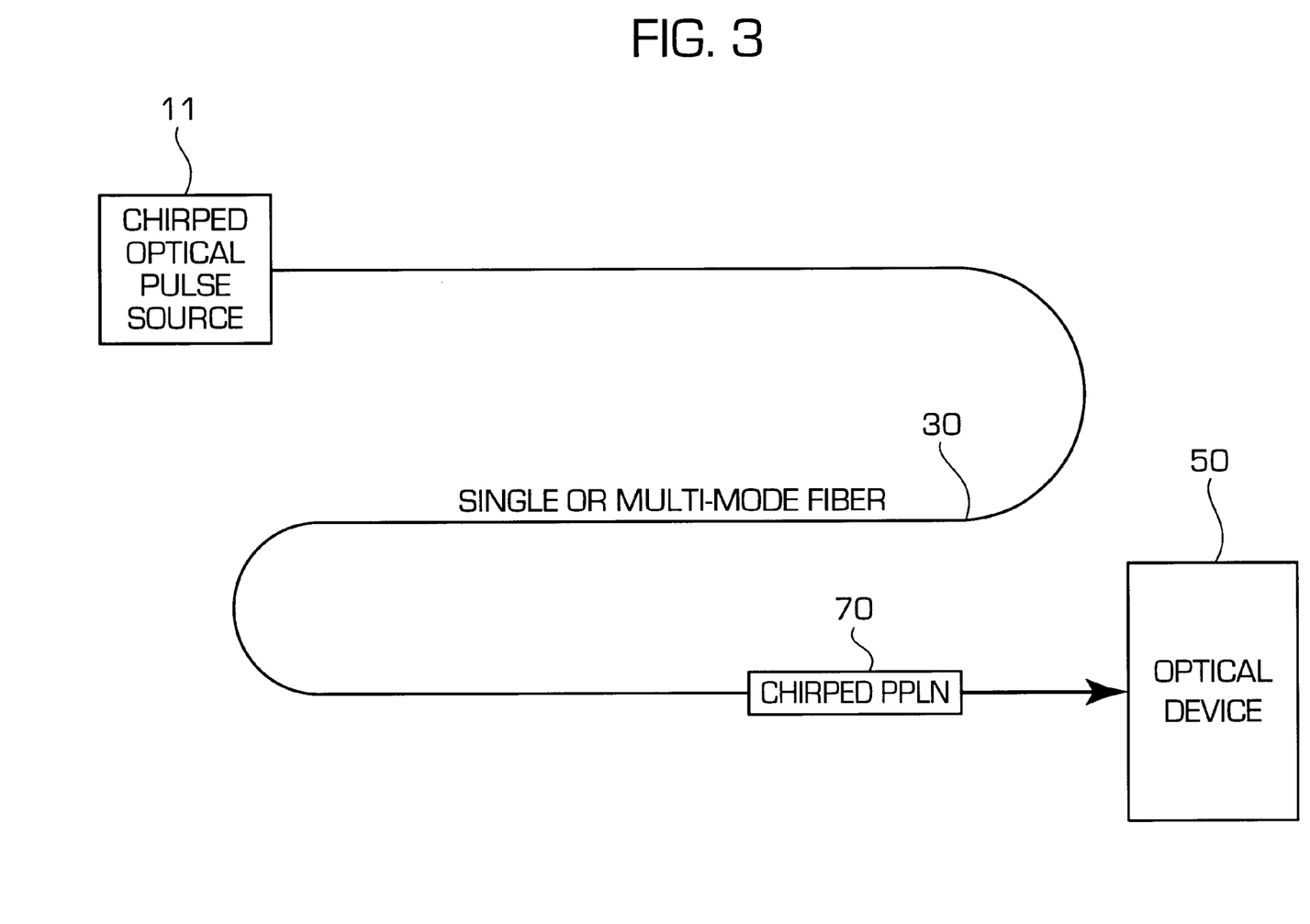
FIG. 3 is a diagrammatic view of an optical fiber delivery apparatus according to the second embodiment of the present invention.

FIG. 3 illustrates the configuration of an optical fiber delivery apparatus according to a second embodiment of the present invention. In FIG. 3, the optical pulses are generated by a chirped optical pulse source 11 with a sufficient chirp to avoid significant non-linearities through single-mode fiber 30. A chirped PPLN 70 is placed after the single-mode fiber 30. Consequently, the fundamental frequency is transmitted through the single-mode fiber 30, and the chirped PPLN 70 compensates for the chirp from the chirped optical pulse source 11 and the single-mode fiber 30. One advantage of using a PPLN for both frequency conversion and pulse compression is that pulses of even higher peak power may be delivered to the measurement device at the frequency converted wavelength, due to the fact that the frequency converted light is not re-injected into optical fiber.

In contrast, for laser sources without chirp, such as the optical pulse source of the first embodiment (FIG. 2), it may be preferable to first frequency convert with a chirped quasi-phasematched grating (chirped PPLN 60). Then, the single-mode fiber 30 recompresses the chirp on the frequency converted pulse.

Thus, a PPLN can be placed either before or after the optical fiber or, when there are multiple frequency conversion devices, they can be on both ends of the optical fiber. The advantage of the chirped quasi-phasematched material is that the proper chirp can be engineered into the material. In addition to PPLN, there may also be used periodically poled lithium tantalate, MgO:LiNbO$_3$, KTP and members of the KTP isomorph family.

Figure 4:
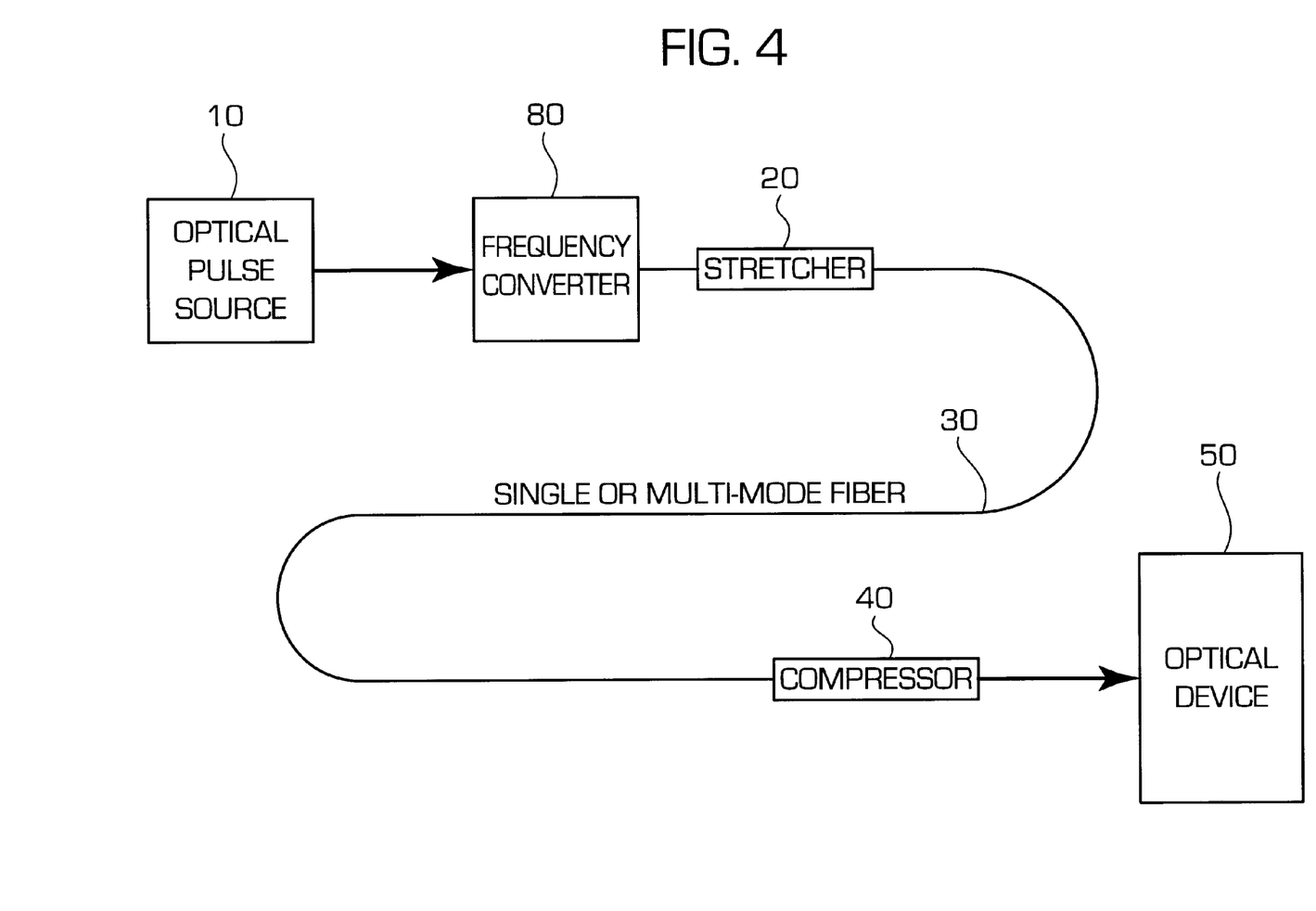
FIG. 4 is a diagrammatic view of an optical fiber delivery apparatus according to the third embodiment of the present invention.
Figure 5:
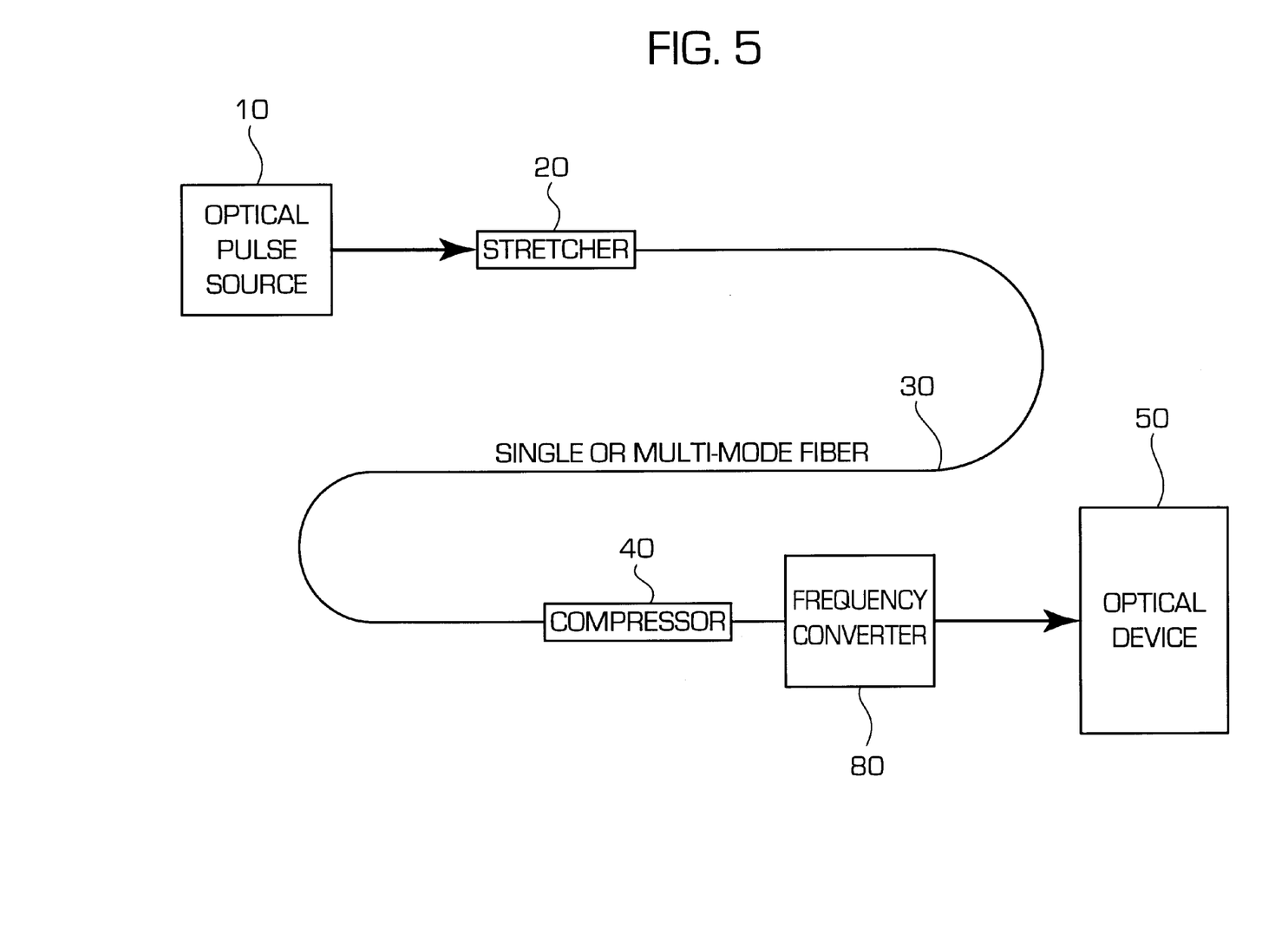
FIG. 5 is a diagrammatic view of another arrangement of an optical fiber delivery apparatus according to the third embodiment of the present invention.

FIG. 4 illustrates the optical fiber delivery apparatus according to a third embodiment of the present invention. As shown in FIG. 4, a frequency converter 80 is interconnected between the optical pulse source 10 and the stretcher 20, so that the frequency converter 80 changes the frequency of the light prior to transmission through fiber 30. The frequency converter 80 changes the frequency of the light so that the optical pulse transmitted to the optical device 50 may be the suitable frequency for the optical device 50. FIG. 5 illustrates another arrangement of the optical fiber delivery apparatus according to the third embodiment of the present invention. In FIG. 5, the frequency converter 80 is interconnected between the compressor 40 and the optical device 50.

As shown in FIGS. 4 and 5, the frequency converter 80 can be either before of after the delivery optical fiber. In some systems, it is preferable to have the frequency converter before the optical fiber, since frequency conversion normally has an efficiency of less than 50%, and this inefficiency lowers the peak power and hence the non-linearities in the optical fiber. In other systems it is preferable to have the frequency converter after the optical fiber, since the optical fiber can then have positive and negative dispersion at the wavelengths of erbium doped optical fiber lasers, so that special optical fiber can be used for dispersion compensation. The most common frequency conversion is frequency doubling; however this optical fiber delivery system can be used with optical parametric generation (OPG) and optical parametric amplification (OPA) and also a combination of multiple frequency conversion including doubling with OPG, OPA and/or frequency difference mixing.

The frequency converter of the fourth and fifth embodiments can be used with the erbium-doped modelocked optical fiber laser described above. Specifically, the laser source may be frequency-doubled in order to create optical pulses having a wavelength of approximately 780 nm using a doubling crystal. These shorter wavelength pulses are coherent with the input 1550 nm pulses generated by the laser source, therefore retaining the phase information of the input pulses. Consequently, it is possible to design the ultrashort pulsed oscillator and optical fiber delivery to pre-compensate at 1550 nm for the dispersion experienced by the ~780 nm light through the optical path of the measurement or imaging system. This is important because, as pointed out earlier, light generated around 780 nm will experience only one sign of dispersion in optical components and therefore it is impossible to perform the type of flexible compensation described herein without the ability to access both signs of dispersion.

Optical fiber delivery of the output of a laser source has several benefits. These include the ability to maintain stable alignment and spatial filtering of multi-mode input when using single-mode optical fiber for the input wavelength. Optical fiber delivery of an input signal to an optical system has these benefits, and also provides for ease of changing the input by changing an optical fiber pigtail. As previously stated, optical fiber can have different signs of dispersion, depending upon the launched wavelength and the optical fiber design. Therefore, an optical fiber pigtail added to the output of a laser can provide further compensation to the type of dispersion launched, while allowing for ease of alignment into an optical system. This also allows for adjustment by the user, pre-calibrated during manufacture of the ultrashort pulse laser source.

Although several exemplary embodiments have been herein shown and described, those of skill in the art will recognize that many modifications and variations are possible without departing from the spirit and scope of the invention, and it is intended to measure the invention only by the appended claims.

What is claimed is:

1. An apparatus for delivering ultrashort optical pulses with high peak power to an optical device, comprising:
   an optical pulse source;
   a pulse stretcher which receives ultrashort optical pulses having high peak power from said optical pulses source and which expands a pulse width of the optical pulses; and
   an optical fiber which transmits the expanded optical pulses over a desired length, said optical fiber having a dispersion selected such that the optical pulses are recompressed at either an output of said optical fiber or at any desired point in the optical device.

2. The apparatus according to claim 1, wherein the pulse stretcher is one of: a chip optical fiber Bragg grating, a diffraction grating pair, and a prism pair.

3. The apparatus according to claim 1, wherein the optical fiber is a multi-mode optical fiber.

4. The apparatus according to claim 1, 2 or 3, further comprising a frequency converter disposed downstream of said optical pulse source, said frequency converter converting a frequency of the optical pulses generated by said optical pulse source to a frequency required by the optical device.

5. An apparatus as claimed in claim 4, wherein said frequency converter is a periodically poled non-linear optical material composed of one of lithium tantalate, MgO:LiNbO$_3$, KTP and members of the KTP isomorph family.

6. The apparatus according to claim 1, wherein the optical fiber is a single-mode optical fiber.

7. The apparatus according to claim 1, wherein said optical fiber compresses the pulse width of the optical pulses transmitted therethrough to provide high peak power optical pulses to the optical device, such that the optical pulses are fully recompressed at an input of, or at any desired point in, the optical device.

8. The apparatus according to claim 1, further comprising a pulse compressor which compresses the pulse width of the optical pulses transmitted through said optical fiber, such that the optical fiber and said compressor combine to fully recompress said optical pulses at an input of, or at any desired point in, the optical device.

9. The apparatus according to claim 1, wherein the pulse compressor is one of: a chirped optical fiber Bragg grating, a diffraction grating pair, and a prism pair.

10. The apparatus according to claim 1, 5 or 6, wherein the optical device is a two-photon laser scanning microscope used to analyze a sample.

11. The apparatus according to claim 10, wherein the optical fiber compensates for dispersion caused by said microscope, such that the optical pulses are fully recompressed at the sample.

12. The apparatus according to claim 1, wherein said optical fiber compresses the pulse width of the optical pulses transmitted therethrough to provide high peak power optical pulses to the optical device, such that the optical pulses are fully recompressed at an input of, or at any desired point in, the optical device.

13. The apparatus according to claim 1, firer comprising a pulse compressor which compresses the pulse width of the optical pulses transmitted through said optical fiber, such that the optical fiber and said compressor combine to fully recompress said optical pulses at an input of, or at any desired point in, the optical device.

14. The apparatus according to claim 13, wherein the pulse compressor is one of: a chirped optical fiber Bragg grating, a diffraction grating pair, and a prism pair.

15. An apparatus for delivering ultrashort optical pulses with high peak power to an optical device, comprising:
   an optical pulse source;
   a periodically poled non-linear frequency converter which receives ultrashort optical pulses having high peak power from said optical pulse source, said periodically poled non-linear frequency converter expanding a pulse width of the optical pulses and changing a frequency of said optical pulses; and
   an optical fiber which transmits the expanded optical pulses over a desired length, said optical fiber having a dispersion that compensates for other dispersions in the apparatus affecting the optical pulses, such that the optical pulses are recompressed at a desired point before or within the optical device.

16. The apparatus according to claim 15, wherein the optical fiber is a single-mode optical fiber.

17. The apparatus according to claim 15, wherein the optical fiber is a multi-mode optical fiber.

18. The apparatus according to claim 15, 16 or 17, wherein said periodically poled non-linear frequency converter is a periodically-poled lithium a niobate (PPLN) crystal.

19. An apparatus as claimed in claim 3 or 17, further including a mode converter disposed in front of said multimode fiber.

20. An apparatus as claimed in claim 19, further including a mode converter disposed behind said multimode fiber.

21. An apparatus as claimed in claims 3 or 17, further including a mode converter disposed behind said multimode fiber.

22. The apparatus according to claim 15, 12 or 13, wherein the optical device is a two-photon laser scanning microscope used to analyze a sample.

23. The apparatus according to claim 22, wherein the optical fiber compensates for dispersion caused by said microscope, such that the optical pulses are fully recompressed at the sample.

24. An apparatus for producing ultrashort optical pulses with high peak power, comprising:
   an optical pulse source;
   an amplifying medium which amplifies the optical pulses, said amplifying medium having a dispersion that compensates for other dispersions in the apparatus affecting the optical pulses; and
   a pulse compressor including a periodically poled non-linear frequency converter which compresses a pulse width of said optical pulses and which changes a frequency of said optical pulses.

25. An apparatus for delivering ultrashort optical pulses with high peak power to an optical device, comprising:
   an optical fiber which receives chirped optical pulses and which transmits the optical pulses over a desired length; and
   a periodically poled non-linear frequency converter which receives the optical pulses from said optical fiber, said periodically poled non-linear frequency converter compressing a pulse width of the optical pulses and changing a frequency of said optical pulses,
   said optical fiber having a dispersion that compensates for other dispersions in the apparatus affecting the optical pulses, such that the optical pulses are recompressed at a desired point before or within the optical device.

26. The apparatus according to claim 25, wherein the optical fiber is an amplifying optical fiber.

27. The apparatus according to claim 25 or 26, wherein the optical fiber is one of a single-mode and multi-mode optical fiber.

28. An apparatus as claimed in claim 27, wherein said fiber is a polarization maintaining fiber.

29. An apparatus as claimed in claim 27, wherein said fiber is an amplifying optical fiber.

30. The apparatus according to claim 25 or 26, wherein said optical fiber compresses the pulse width of the optical pulses transmitted therethrough to provide high peak power optical pulses to the optical device, such that the optical pulses are recompressed at a desired point before or within the optical device.

31. The apparatus according to claim 30, wherein the optical device is a two-photon laser scanning microscope used to analyze a sample.

32. The apparatus according to claim 31, wherein the optical fiber compensates for dispersion caused by said microscope, such that the optical pulses are fully recompressed at the sample.

33. The apparatus according to claim 25, wherein said periodically poled non-linear frequency converter is a periodically-poled lithium niobate (PPLN) crystal.

34. A method for delivering ultrashort optical pulses with high peak power to an optical device, comprising the steps of:
   generating ultrashort optical pulses having high peak power,
   transmitting the optical pulses over an optical fiber,
   compressing the pulse width of the optical pulses transmitted through said optical fiber by compensating for dispersion; and
   delivering the optical pulses to the optical device.

35. The method according to claim 34, wherein the compressing step compensates for dispersion caused by the optical device.

36. The method according to claim 34, further comprising the step of frequency converting a frequency of the optical pulses generated in said generating step to a frequency required by the optical device.

37. The method according to claim 36, wherein the frequency converting step is performed prior to the transmitting step.

38. The method according to claim 36, wherein the frequency converting step is performed after the transmitting step.

39. The method according to claim 36, further including the step of amplifying said optical pulses within said optical fiber.

40. The method according to claim 36, wherein said generating step produces chirped optical pulses at the output of an optical pulse source.

41. The method according to claim 36, further comprising the step of stretching a pulse width of the optical pulses subsequent to their generation in an optical pulses source.

42. An apparatus as claimed in claim 1 or 34, further including an optical element disposed following said optical fiber for, together with said optical fiber, fully recompressing said optical pulses.

43. An apparatus as claimed in claim 42, wherein said optical element is a compressor.

44. An apparatus as claimed in claim 42, wherein said optical element includes at least one of a dispersion compensating optical glass material and a prism pair.

45. An apparatus as claimed in claim 1, 15, 25 or 34, wherein said optical fiber fully recompresses said optical pulses.

46. An apparatus for delivering ultrashort optical pulses with high peak power to an optical device, comprising;

an optical pulse source for generating said ultrashort optical pulses;

means for creating a temporal separation among wavefronts of different frequency components of said optical pulses by one of generating chirped pulses at said optical pulse source and employing a discrete stretcher subsequent to said optical pulse source;

an optical fiber which transmits the optical pulses over a desired length, said optical fiber having a dispersion selected so as to effect at least substantial temporal coincidence among said wavefronts at a desired point.

47. An apparatus for delivering ultrashort optical pulses with high peak power to an optical device, comprising;

an optical pulse source for generating said ultrashort optical pulses;

means for creating temporal separation among wavefronts of different frequency components of said optical pulses by one of creating chirped pulses at said optical pulse source and employing a discrete stretcher subsequent to said optical pulse source; and an optical fiber which transmits the optical pulses over a desired length, said optical fiber having a dispersion selected so as to at least reduce said temporal separation.

48. An apparatus as claimed in claim 1, 3, 4, 15, 16, 17, 24, 25, 34, 46 or 47, wherein said fiber is an amplifying optical fiber.

49. An apparatus as claimed in claim 1, 3, 4, 15, 16, 17, 24, 25, 34, 46 or 47, wherein said fiber is a polarization maintaining fiber.

50. An apparatus as claimed in claim 49, wherein said fiber is an amplifying optical fiber.

51. An apparatus as claimed in claim 49, wherein said fiber is a rare-earth ion-doped optical fiber.

52. An apparatuses claimed in claim 49, wherein said fiber has a non-circularly symmetric core.

53. An apparatus as claimed in claim 49, wherein said fiber includes regions subjected to stress.

54. An apparatus as claimed in claim 1, 15, 24, 25, 34, 46 or 47, wherein said fiber is one of a single mode and multi-mode rare earth ion-doped optical fiber.

55. An apparatus as claimed in claim 54, wherein said fiber is one of a single mode and multimode rare earth ion-doped optical fiber.

56. An apparatus as claimed in claim 1, 15, 24, 25, 34, 46, or 47, wherein said fiber is a multimode fiber which in use transmits at least substantially only the fundamental mode.

57. An apparatus as claimed in claim 56, wherein said multimode fiber is an amplifying fiber.

58. An apparatus as claimed in claim 56, further including a mode converter disposed in front of said multimode fiber.

59. An apparatus as claimed in claim 56, further including a mode converter disposed behind said multi-mode fiber.

60. An apparatus as claimed in claim 47, further including an optical element disposed following said optical fiber for further reducing said temporal separation.

61. An apparatus as claimed in claim 60, wherein said optical element is a compressor.

62. An apparatus as claimed in claim 60, wherein said optical element includes at least one of a dispersion compensating optical glass material and a prism pair.

* * * * *